(12) United States Patent
Dai

(10) Patent No.: US 9,090,302 B2
(45) Date of Patent: Jul. 28, 2015

(54) BICYCLE

(71) Applicant: Weifeng Dai, Ningbo (CN)

(72) Inventor: Weifeng Dai, Ningbo (CN)

( * ) Notice: Subject to any disclaimer, the term of this patent is extended or adjusted under 35 U.S.C. 154(b) by 73 days.

(21) Appl. No.: 14/083,396

(22) Filed: Nov. 18, 2013

(65) Prior Publication Data

US 2014/0070514 A1    Mar. 13, 2014

Related U.S. Application Data

(63) Continuation-in-part of application No. PCT/CN2012/000076, filed on Jan. 17, 2012.

(30) Foreign Application Priority Data

May 18, 2011 (CN) .......................... 2011 1 0128915

(51) Int. Cl.
| | |
|---|---|
| *B62B 3/02* | (2006.01) |
| *B62K 5/003* | (2013.01) |
| *B62K 5/08* | (2006.01) |
| *B62K 15/00* | (2006.01) |
| *B62K 5/00* | (2013.01) |
| *B62B 5/06* | (2006.01) |
| *B62B 7/12* | (2006.01) |
| *B62B 9/20* | (2006.01) |

(52) U.S. Cl.
CPC . *B62K 15/00* (2013.01); *B62B 3/02* (2013.01); *B62B 5/064* (2013.01); *B62B 7/12* (2013.01); *B62B 9/20* (2013.01); *B62K 5/00* (2013.01); *B62B 5/067* (2013.01); *B62B 2205/18* (2013.01); *B62B 2206/006* (2013.01)

(58) Field of Classification Search
CPC ........ B62K 13/00; B62K 15/00; B62K 5/003; B62K 5/08
USPC ............ 280/202, 210, 278, 287, 282, 30, 7.1, 280/7.15, 7.17; 224/415, 420, 425
See application file for complete search history.

(56) References Cited

U.S. PATENT DOCUMENTS

| | | | | |
|---|---|---|---|---|
| 4,639,007 A * | 1/1987 | Lawrence | ...................... | 280/234 |
| 4,824,130 A * | 4/1989 | Chiu | .............................. | 280/239 |
| 6,170,844 B1 * | 1/2001 | Sasi | .............................. | 280/209 |
| 6,203,043 B1 * | 3/2001 | Lehman | ..................... | 280/288.1 |
| 6,851,498 B1 * | 2/2005 | Sauve | .......................... | 180/208 |
| 8,672,075 B1 * | 3/2014 | Walker | ...................... | 180/206.1 |
| 2001/0035626 A1 * | 11/2001 | Kettler | ......................... | 280/282 |

(Continued)

FOREIGN PATENT DOCUMENTS

EP           2295317         *   3/2011

*Primary Examiner* — Anne Marie Boehler
(74) *Attorney, Agent, or Firm* — Matthias Scholl P.C.; Matthias Scholl

(57) ABSTRACT

A four wheeled cycle including a frame, a load carrying base, two front wheels, two rear wheels, a steering mechanism, a brake mechanism, a pedal mechanism, a chain drive mechanism, and a saddle unit. The frame is a retractable frame, including a rear support frame, a down tube, a transverse tube, and at least two telescopic casing tube assemblies that are arranged side by side. Each of the telescopic casing tube assemblies includes a front casing tube, a middle rod, and a rear casing tube. The load carrying base includes a cross bar, a front connecting rod, a left connecting rod, a right connecting rod, a rear connecting rod and internally hinged bars for linking the connecting rods. The two front wheels are respectively connected to two ends of the cross bar through a bearing at the top ends of a front fork.

11 Claims, 10 Drawing Sheets

(56) References Cited

U.S. PATENT DOCUMENTS

2004/0245745 A1* 12/2004 Vasser ........................... 280/282
2005/0093270 A1* 5/2005 Wilcox et al. ................. 280/282
2014/0049022 A1* 2/2014 Dopf ............................. 280/278

* cited by examiner

BICYCLE

CROSS-REFERENCE TO RELATED APPLICATIONS

This application is a continuation-in-part of International Patent Application No. PCT/CN2012/000076 with an international filing date of Jan. 17, 2012, designating the United States, now pending, and further claims priority benefits to Chinese Patent Application No. 201110128915.7 filed May 18, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a multi-functional four wheeled cycle.

2. Description of the Related Art

Conventional bicycles including folding bicycles, retractable bicycles, tricycles, and baby strollers have monotonous function and poor compatibility.

A typical multi-functional four wheeled cycle consists of a frame, four wheels, a chain drive mechanism, a pedal mechanism, a saddle, a handlebar, and a steering mechanism, which is suitable for the elderly and can be used as an indoor keep-fit four wheeled cycle by additionally installing supporting mechanisms. However, the frame and the steering mechanism of the multi-functional four wheeled cycle are complex thereby being difficult to operate. Both front and rear fixed supports are triangle frames. The pedal mechanism and the chain drive mechanism are disposed between the front fixed support and the rear fixed support. The large and small faceplates of the chain drive mechanism are fastened respectively to both ends of a telescopic tube. Since the length of the chain is constant, the expansion of the telescopic tube will inevitably result in the looseness or detachment of the chain. Therefore, the design of the telescopic tube of the conventional multi-functional four wheeled cycle is impracticable. Furthermore, the multi-functional four wheeled cycle also has such disadvantages as a large volume, a complex structure, poor design, inconvenience for storage and a non-folding and non-retractable structure.

SUMMARY OF THE INVENTION

In view of the above-described problems, it is one objective of the invention to provide a multi-functional four wheeled cycle that is simple in structure and convenient for operation. The multi-functional four wheeled cycle can be transformed into a shopping cart, a baby stroller, and a picnic car.

To achieve the above objective, in accordance with one embodiment of the invention, there is provided a multi-functional four wheeled cycle comprising a frame, a load carrying base, two front wheels, two rear wheels, a steering mechanism, a brake mechanism, a pedal mechanism, a chain drive mechanism, and a saddle unit. The frame is a retractable frame, comprising a rear support frame, a down tube, a transverse tube, and at least two telescopic casing tube assemblies that are arranged side by side. Each of the telescopic casing tube assemblies comprises a front casing tube, a middle rod, and a rear casing tube. The load carrying base comprises a cross bar, a front connecting rod, a left connecting rod, a right connecting rod, a rear connecting rod and internally hinged bars for linking the connecting rods. The two front wheels are respectively connected to two ends of the cross bar of the load carrying base through a bearing at the top ends of a front fork. The two rear wheels are respectively connected to two ends of a main axle of a rear axle through a bearing. The steering mechanism comprises a handlebar, a horizontal connecting rod, steering arms, a main rod of the handlebar, and a movable connecting rod that is fastened to a bottom end of the main rod of the handlebar. The movable connecting rod and the horizontal connecting rod are connected to form a movable diamond frame. The main rod of the handlebar comprises an upper main rod and a lower main rod. The brake mechanism comprises a disc brake, a disc brake block, and a brake crank. The pedal mechanism comprises a pedal, a crank arm, a main axle, and a casing tube of the pedal. The chain drive mechanism comprises a large faceplate unit, a small faceplate unit, and a chain. The saddle unit comprises a saddle and a seat post.

In a class of this embodiment, the front casing tube of the frame is fastened to the bottom of the load carrying base and sleeves a front end of the middle rod in a movable way. The rear casing tube of the frame is fastened to and sleeves a rear end of the middle rod. The middle rod before the rear casing tube of the frame can completely retract into the front casing tube of the frame. A tube mouth of the front casing tube of the frame is provided with a second fastening device which is used to fasten the middle rod so as to adjust the telescopic movement of the middle rod in the front casing tube of the frame.

In a class of this embodiment, each of the telescopic casing tube assemblies comprises at least two telescopic casing tube assemblies that are arranged horizontally side by side. The tube mouth of the front casing tube is provided with guide ribs. The middle rod is provided with a guide groove that is used to determine the telescopic length. The guide ribs and the guide groove cooperate with each other in a sliding way. Optionally, each front casing tube of the frame is installed side by side and is fastened to the bottom of the load carrying base. Each rear casing tube of the frame is installed and fixed with a corresponding front casing tube of the frame side by side. The front casing tube and the middle rod are corresponding tubes of any regular shapes. The middle rod and the front casing tube cooperate with each other in a sliding way.

In a class of this embodiment, the rear support frame comprises a rear vertical tube, a left slanting branch tube, and a right slanting branch tube. An upper end of the left slanting branch tube and an upper end of the right slanting branch tube are respectively welt to the rear vertical tube. A lower end of the left slanting branch tube and a lower end of the right slanting branch tube are respectively welt to both ends of the main axle of the rear axle. A lower end of the rear vertical tube and a rear end of the transverse tube are respectively fastened to a midpoint of the main axle of the rear axle. The rear casing tube is fastened to an upper end of the down tube and to an upper end of the rear vertical tube. A lower end of the down tube and the front end of the transverse tube are respectively fastened to the axle sleeve of the pedal mechanism.

In a class of this embodiment, the bottom of the load carrying base is provided with the load carrying cross bar on the top ends of the two front forks. Two ends of the cross bar are connected to the two front forks through the bearing in a movable way. The midpoint of the cross bar is fastened to the front casing tube of the frame to form a cross; and the cross bar and the front casing tube of the frame are in the same plane. The hinged bars for dismounting, installation, and horizontal folding are provided in the plane of the load carrying base. The load carrying base comprises the front connecting rod, the left connecting rod, the right connecting rod, and the rear connecting rod. The front connecting rod, the left connecting rod, the right connecting rod, and the rear connecting rod are respectively connected and hinged with bars. The sides of bars are provided with connecting hooks that are used to connect the adjacent bars. A shopping basket can be formed by opening the bars in the load carrying base and connecting the bars with the connecting hooks. The size of the load carrying base is designed to match up with a child safety seat. The load carrying base is also provided with a transparent elastic shield which is safe and weatherproof.

In a class of this embodiment, the two front wheels are connected to the load carrying base through two front forks and the bearing at the top ends of the two front forks, respectively.

In a class of this embodiment, the two rear wheels are respectively connected to the two ends of the main axle of the rear axle through an overrun clutch. The differential effect of the overrun clutch allows the four wheeled cycle to run stably during the steering movement of the four wheeled cycle.

In a class of this embodiment, the steering mechanism comprises a handlebar, a horizontal connecting rod, steering arms, a main rod of the handlebar and a movable connecting rod that is fastened to the bottom end of the main rod of the handlebar. The movable connecting rod and the horizontal connecting rod are connected to form a movable diamond frame that coordinates the two front wheels in steering. Both sides of the top end of the handlebar are respectively provided with a hand grip, a brake crank, and a regulator. Two ends of the horizontal connecting rod are respectively fastened to the steering arms at the front of the inner sides of the front forks through the bearing in a movable way. The two steering arms present a certain angle and are respectively fastened to the front of the inner sides of the front forks. The main rod of the handlebar comprises a lower main rod that passes through a pad bearing fastened to the bottom of the load carrying base and an upper main rod that is connected to the top end of the lower main rod through a mortise and tenon joint in a movable way. The bottom end of the upper main rod is connected to the top end of the lower main rod through pins and rivets in a movable way. The top of the tenon of the bottom end of the upper main rod is provided with an upper arc-shaped cluster gear in a movable way. A lower arc-shaped cluster gear is fastened to the mortise at the top end of the lower main rod. The upper arc-shaped cluster gear and the lower arc-shaped cluster gear are engaged with each other. A spring is arranged inside the upper main rod. A top end of the spring is fastened to the inside of the upper main rod. A bottom end of the spring is closely connected to a top end of the upper arc-shaped cluster gear. The top end of the upper arc-shaped cluster gear is fastened to a steel wire rope. The steel wire rope is fastened to the regulator through the spring in the tube of the upper main rod. The upper arc-shaped cluster gear is provided with an oval hole. The pins and rivets connect the lower main rod with the upper main rod in a movable way through the oval hole. The upper main rod can be adjusted at will within an angle between the upward vertical direction and the horizontal direction by using the regulator to separate and recombine the upper arc-shaped cluster gear and the lower arc-shaped cluster gear.

In a class of this embodiment, the movable connecting rod and the horizontal connecting rod are connected to form a movable diamond frame that is used to coordinate the two front wheels in steering. The movable connecting rod comprises the first movable connecting rod, the second movable connecting rod and the third movable connecting rod. The bottom end of the lower main rod is fastened to the center of the first movable connecting rod. One end of the second movable connecting rod and one end of the third movable connecting rod are respectively fastened to the two ends of the first movable connecting rod through bearings. The other end of the second movable connecting rod and the other end of the third movable connecting rod are fastened to the horizontal connecting rod through bearings. The two ends of the horizontal connecting rod are respectively connected to steering arms through the bearing in a movable way. The two steering arms present a certain angle and are respectively fastened to the front of the inner sides of the front forks.

In a class of this embodiment, the brake mechanism comprises a brake crank, a disc brake, and a disc brake block. The disc brake is fastened to the inner walls of the two front forks and the rear vertical tube. The disc brake block is fastened to the inner sides of the two front wheels and the main axle of the rear axle. The brake crank is installed on the two ends of the handlebar. The brake crank controls the disc brake through a brake cable.

In a class of this embodiment, the chain drive mechanism comprises a large faceplate unit installed on the pedal mechanism and a small faceplate unit installed on the main axle of the rear axle. The large faceplate unit and the small faceplate unit are connected through chains to realize chain transmission. The largest faceplate of the small faceplate unit is arranged on the main axle of the rear axle backward and forward. The largest faceplate can drive the four wheeled cycle to run forward and backward through chains to realize chain transmission. The rest faceplates are fastened on the main axle of the rear axle forward, which drives the four wheeled cycle to run forward only.

In a class of this embodiment, the saddle is installed on the top end of the seat post. The seat post is inserted in the rear vertical tube. The rear vertical tube is provided with a first fastening device which is used to adjust the up and down movements of the seat post in the rear vertical tube and can allow the seat post to move up and down in the rear vertical tube freely.

Advantages of the invention are summarized below. The invention provides a multi-function four wheeled cycle. The four wheeled cycle can be transformed into a shopping cart if the middle rod completely retracts into the front casing tube of the frame, the bars for dismounting, installation, and horizontal folding built in the load carrying base are unfolded and the angle between the upper main rod and the frame is adjusted by the regulator installed on the handlebar. The four wheeled cycle can be transformed into a baby stroller if a child safety seat is installed in the unfolded bars of the load carrying base. The four wheeled cycle can be transformed into a picnic table which is convenient for picnic if the bars imbedded in the load carrying base are opened, making the front, left and right bars hang and lay the rear bars to keep flat with the bottom of the load carrying base. If the middle rod completely retracts into the front casing tube of the frame, the first fastening device is adjusted to lower the saddle and the seat post, the regulator is adjusted to fold the upper main rod backward to keep flat between two rear casing tubes, and the bars of the four sides are folded and retracted to keep the bars and the load carrying base in the same plane, the volume of the whole four wheeled cycle becomes smaller and the four wheeled cycle can be put in trunks or cabinets.

To sum up, the invention provides a multi-function four wheeled cycle which can be transformed into a baby stroller, a shopping cart, and a picnic car and are more suitable for busy people to relax and hike in their spare time. On the premise of keeping the four wheels safe and stable, the bars and the frame retract and the handlebar is folded to minimize the volume of the four wheeled cycle to make the four wheeled cycle easy to carry and take care of. The invention provides a multi-function four wheeled cycle which has advantages of exquisite design, a simple structure, ingenious connection methods, convenient transformation methods, portable, practical and fashion design, great volume changes, coordinated and beautiful appearances, telescopic frames and foldable and telescopic handlebars. The four wheeled cycle can realize convenient transformation between a baby stroller, a shopping cart, and a picnic car.

The invention is suitable for people of all ages for various purposes, which can be used as a baby stroller, a shopping cart, and a picnic car or fitness equipment.

DETAILED DESCRIPTION OF THE EMBODIMENTS

Figure 1:
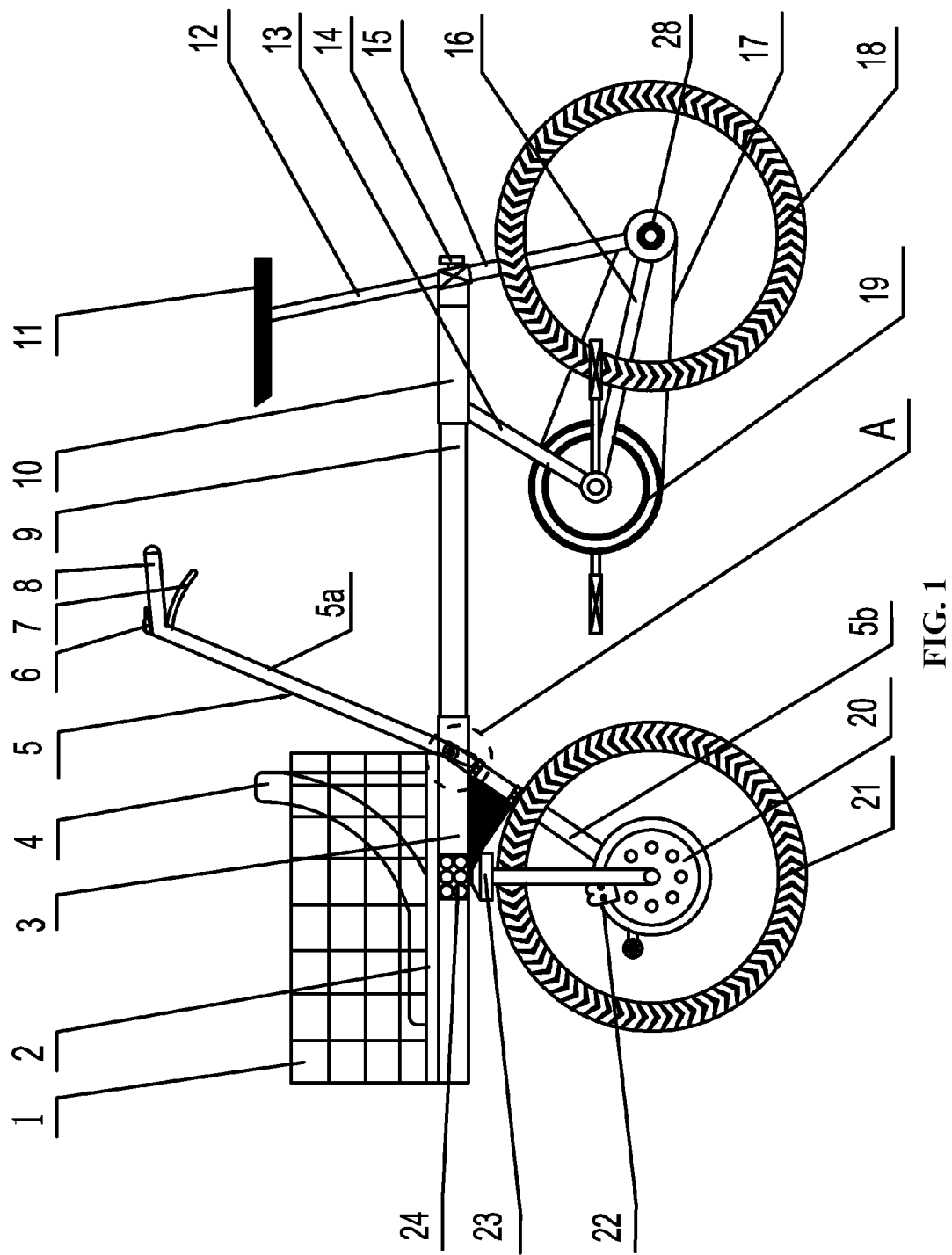
FIG. 1 is a front view of a four wheeled cycle in accordance with one embodiment of the invention.
Figure 2:
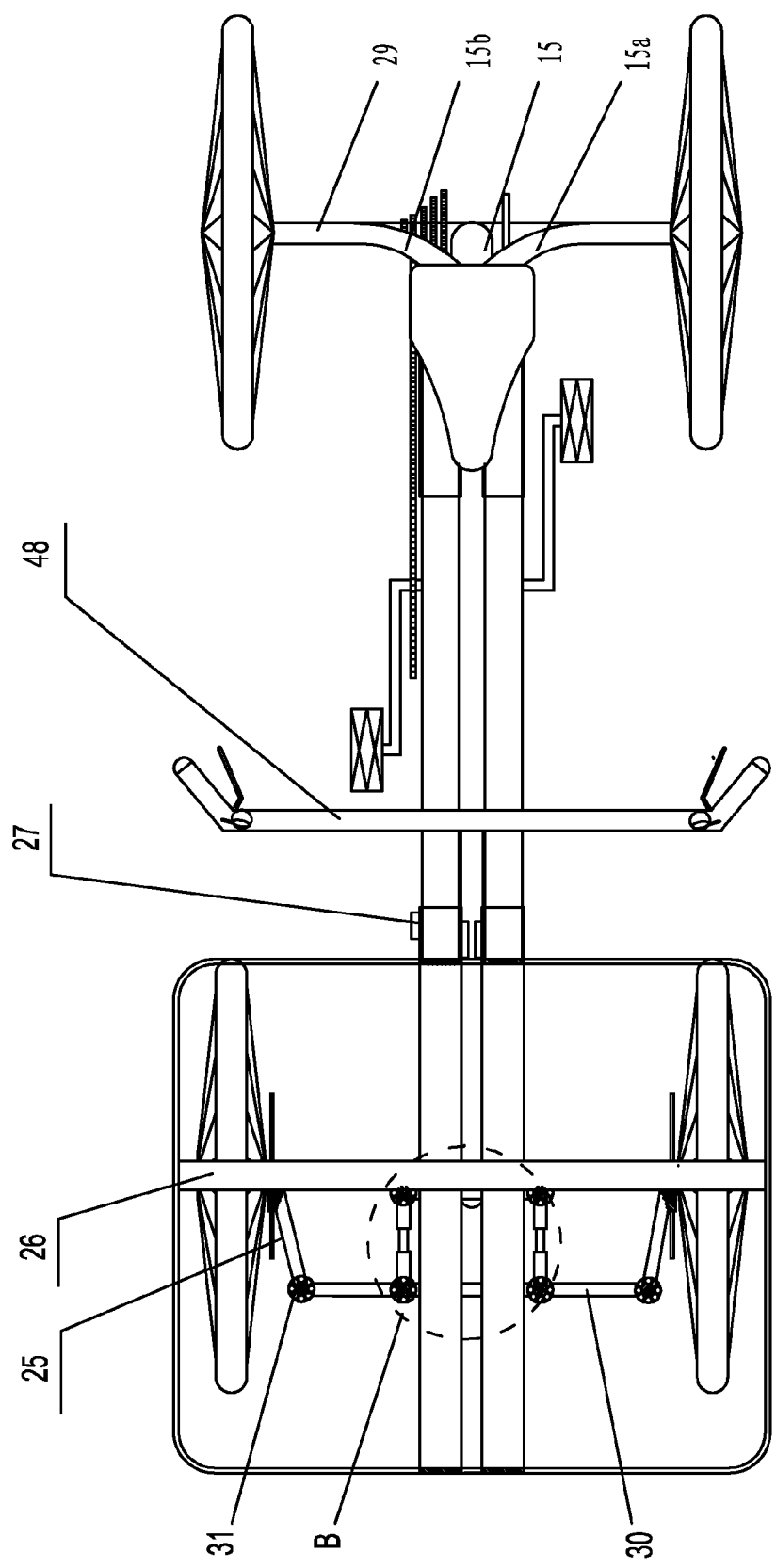
FIG. 2 is a plan view of a four wheeled cycle in accordance with one embodiment of the invention.
Figure 3:
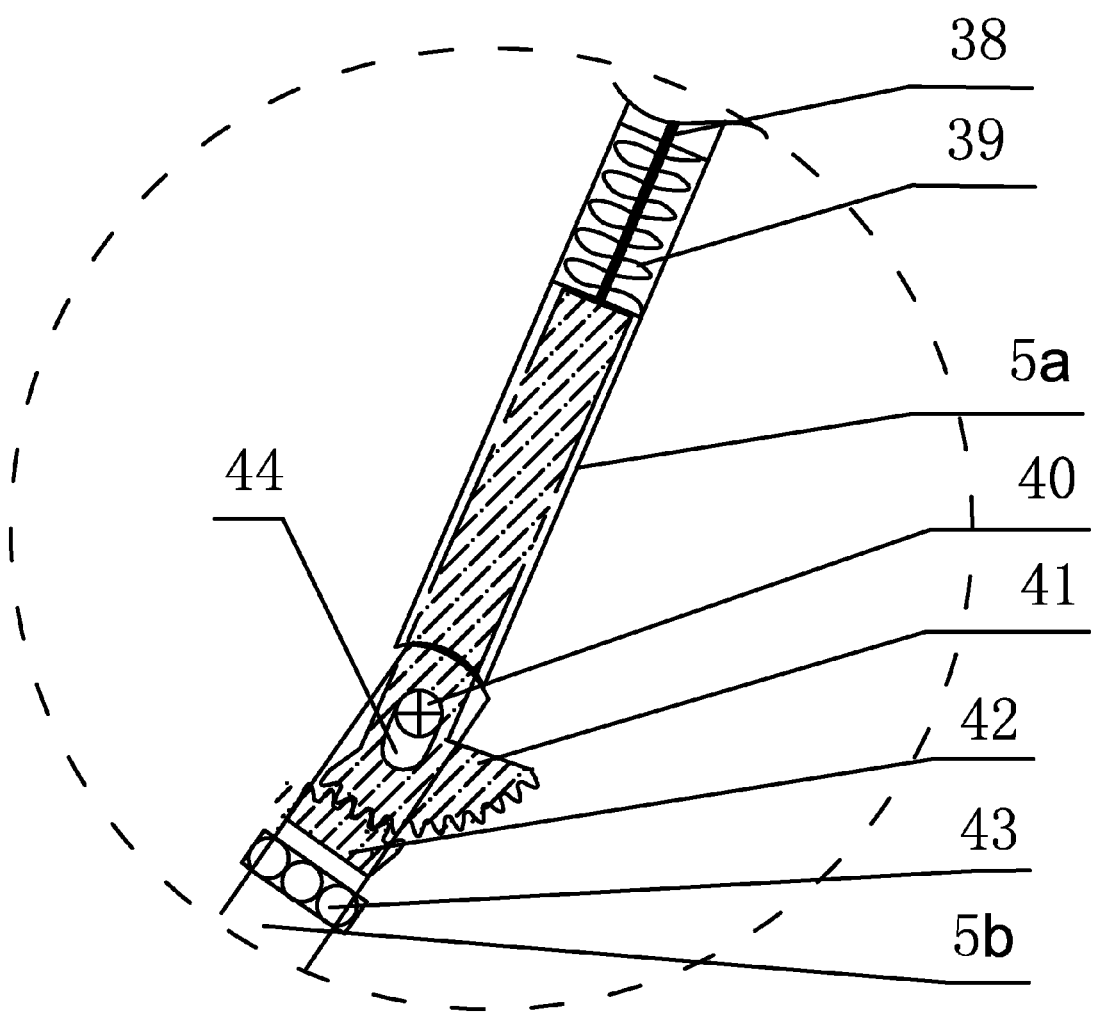
FIG. 3 is a partial enlarged view of part A of FIG. 1.

As shown in FIG. 1 and FIG. 2, a multi-function four wheeled cycle comprises a frame, a load carrying base 2, two front wheels 21, two rear wheels 18, a steering mechanism, a brake mechanism, a pedal mechanism, a chain drive mechanism, and a saddle unit 11.

As shown in FIGS. 1-7, the frame is a retractable frame, comprising a rear support frame, a down tube 13, a transverse tube 16, and at least two telescopic casing tube assemblies that are arranged side by side. Each of the telescopic casing tube assemblies comprises a front casing tube 3, a middle rod 9, and a rear casing tube 10. The load carrying base 2 comprises a cross bar 26, a front connecting rod 32, a left connecting rod 33, a right connecting rod 34, a rear connecting rod 35 and hinged bars 1 for connecting the connecting rods. The two front wheels 21 are respectively connected to the two ends of the cross bar 26 through a first bearing 24 at the top ends of a front fork 23. The two rear wheels 18 are respectively connected to two ends of a main axle 29 of the rear axle through bearings. The steering mechanism comprises a handlebar 48, a horizontal connecting rod 30, steering arms 25, a main rod 5 of the handlebar and a movable connecting rod that is fastened to the bottom end of the main rod of the handlebar. The movable connecting rod and the horizontal connecting rod are connected to form a movable diamond frame (the structure shown in the Part B of FIG. 2). The main rod 5 of the handlebar comprises an upper main rod 5a and a lower main rod 5b. The brake mechanism comprises a disc brake 22, a disc brake block 20, and a brake crank 7. The pedal mechanism comprises a pedal, crank arms, and a main axle and casing tube of the pedals. The chain drive mechanism comprises a large faceplate unit 19, a small faceplate unit 37 and a chain 17. The saddle unit comprises a saddle 11 and a seat post 12.

As shown in FIG. 1 and FIG. 2, the telescopic frame comprises a rear support frame, a down tube 13, a transverse tube 16 and at least two telescopic casing tube assemblies that are arranged side by side. Each of the telescopic casing tube assemblies comprises a front casing tube 3, a middle rod 9, and a rear casing tube 10. The front casing tube 3 of the frame is fastened to the bottom of the load carrying base 2 and sleeves the front end of the middle rod 9 of the frame in a movable way. The rear casing tube 10 of the frame is fastened to and sleeves the rear end of the middle rod 9 of the frame. The middle rod 9 of the frame before the rear casing tube 10 of the frame can completely retract into the front casing tube 3 of the frame. A tube mouth of the front casing tube 3 of the frame is provided with a second fastening device 27 which is used to fasten the middle rod 9 of the frame so as to adjust the telescopic movement of the middle rod in the front casing tube 3 of the frame.

The tube mouth of the front casing tubes 3 of the frame is provided with guide ribs. The middle rod 9 of the frame is provided with a guide groove that is used to determine the telescopic length. The guide ribs and the guide groove cooperate with each other in a sliding way. Optionally, each front casing tube 3 of the frame is installed side by side and is fastened to the bottom of the load carrying base 2. Each rear casing tube 10 of the frame is installed and fixed with the corresponding front casing tube 3 of the frame side by side. The front casing tubes 3 of the frame and the middle rod 9 of the frame are corresponding tubes of any regular shapes. The middle rod 9 of the frame and the front casing tubes 3 of the frame cooperate with each other in a sliding way.

Figure 5:
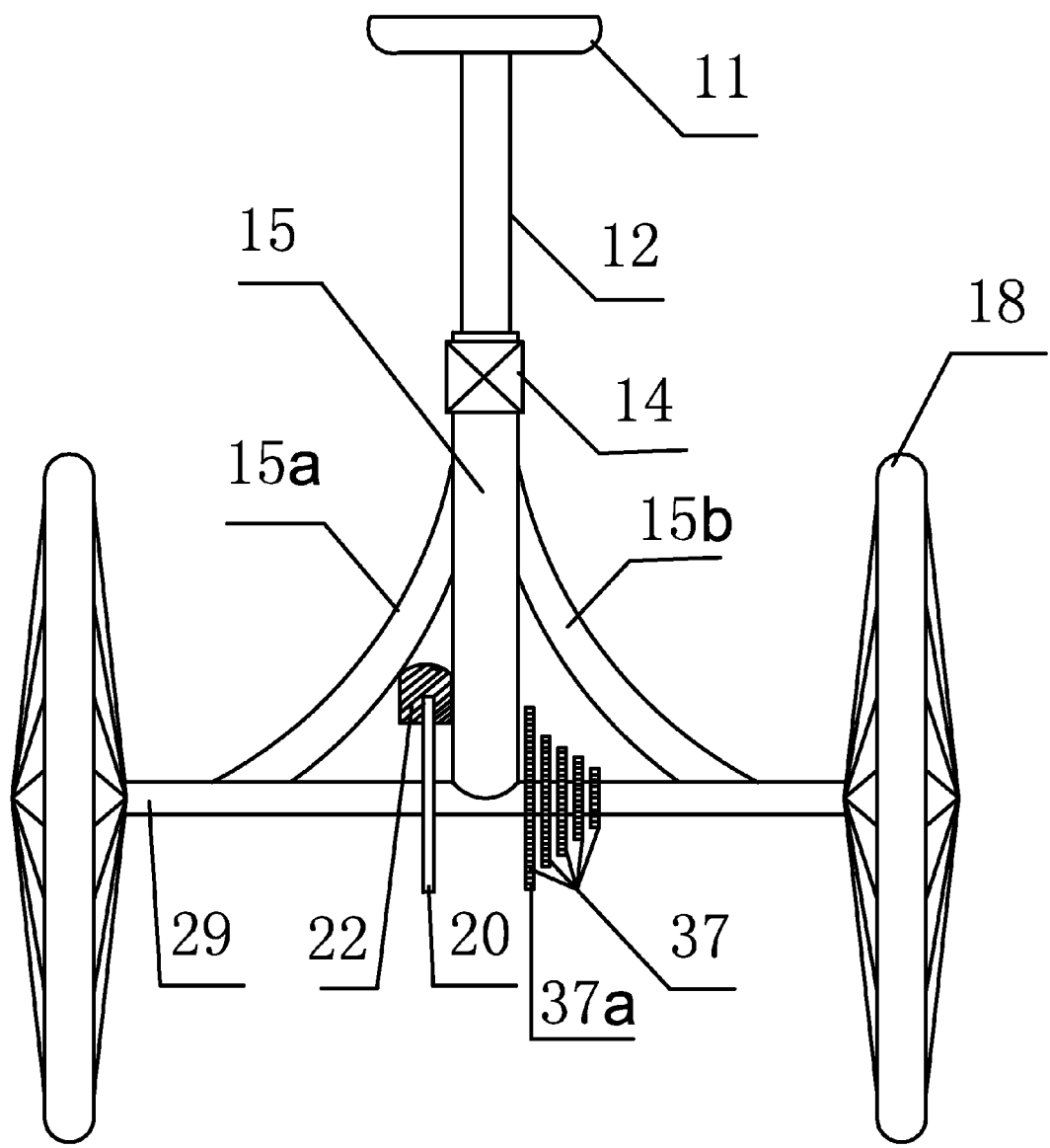
FIG. 5 is a schematic diagram of a rear support frame of a four wheeled cycle in accordance with one embodiment of the invention.

As shown in FIG. 5, the rear support frame comprises a rear vertical tube 15, a left slanting branch tube 15a, and a right slanting branch tube 15b. The top end of the left slanting branch tube 15a and the top end of the right slanting branch tube 15b are respectively welt to the rear vertical tube 15. The bottom end of the left slanting branch tube 15a and the bottom end of the right slanting branch tube are respectively welt to the two ends of the main axle 29 of the rear axle of the rear wheels 18. The bottom end of the rear vertical tube 15 of the frame and the rear end of the transverse tube 16 of the frame are respectively fastened to the midpoint of the main axle 29 of the rear axle. The rear casing tubes 10 of the frame are respectively fastened to the top end of the down tube 13 of the frame as well as the top end of the rear vertical tube 15 of the frame. The bottom end of the down tube 13 of the frame and the front end of the transverse tube 16 of the frame are fastened to the axle sleeve of the pedal mechanism.

Figure 6:
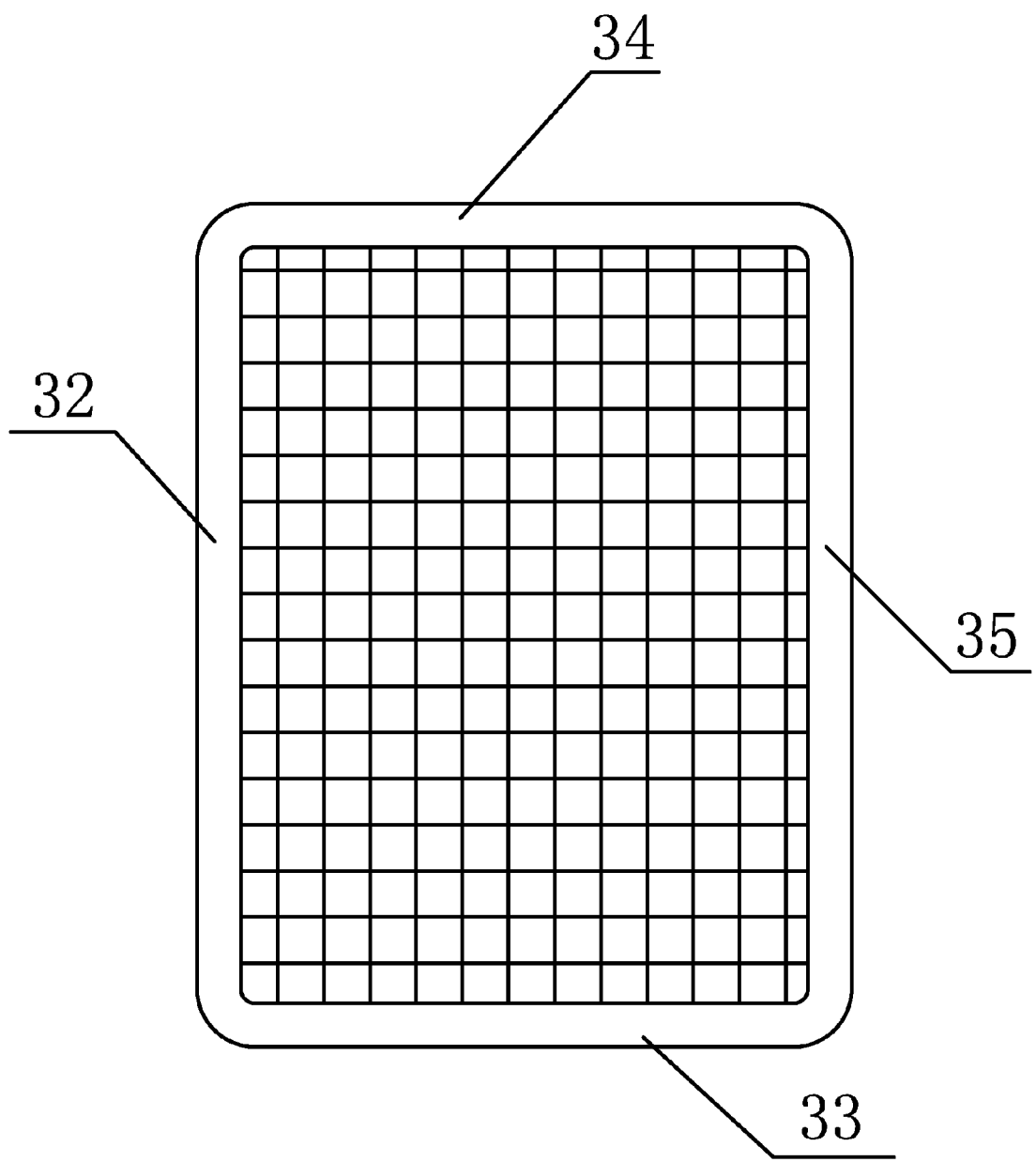
FIG. 6 is a schematic diagram of a bottom structure of hinged bars of a load carrying base of a four wheeled cycle of the invention.
Figure 7:
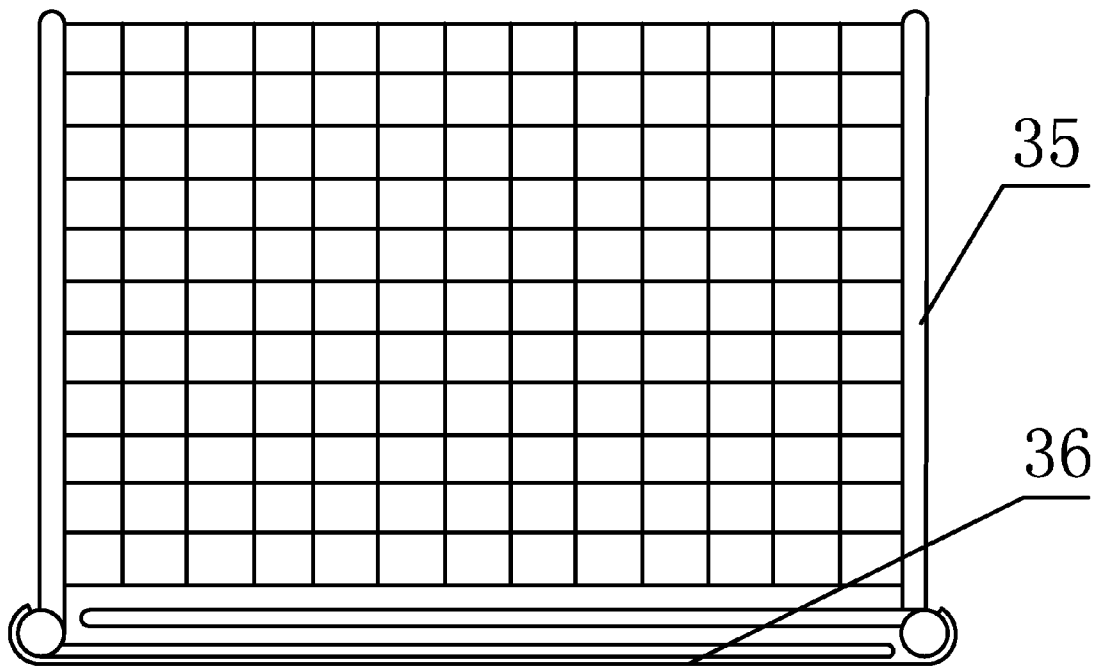
FIG. 7 is a longitudinal sectional view of hinged bars of a load carrying base of a four wheeled cycle of the invention.

As shown in FIG. 2, FIG. 6 and FIG. 7, the bottom of the load carrying base 2 is provided with the load carrying cross bar 26 on the top ends of the two front forks 23. Two ends of the cross bar 26 are connected to the two front forks 23 through the first bearing 24 in a movable way. The midpoint of the cross bar 26 is fastened to the front casing tube 3 of the frame to form a cross; and the cross bar 26 and the front casing tube 3 of the frame are in the same plane. The hinged bars 1 for dismounting, installation, and horizontal folding are provided in the plane of the load carrying base 2. The load carrying base 2 comprises the front connecting rod 32, the left connecting rod 33, the right connecting rod 34 and the rear connecting rod 35. The front connecting rod 32, the left connecting rod 33, the right connecting rod 34 and the rear connecting rod 35 are respectively connected through hinged bars. The sides of bars 1 are provided with connecting hooks that are used to connect the adjacent bars 1. A shopping basket can be formed by opening the bars 1 in the load carrying base 2 and connecting the bars 1 with the connecting hooks. The size of the load carrying base 2 is designed to match up with a child safety seat 4. The load carrying base is also provided with a transparent elastic shield which is safe and weatherproof.

The two front wheels 21 are connected to the load carrying base 2 through two front forks 23 and the first bearing 24 at the top ends of the two front forks 23, respectively.

The two rear wheels 18 are respectively connected to the two ends of the main axle 29 of the rear axle through an overrun clutch 28. The differential effect of the overrun clutch 28 will allow the four wheeled cycle to run stably during the steering movement of the four wheeled cycle.

As shown in FIGS. 1-4, the steering mechanism comprises a handlebar 48, a horizontal connecting rod 30, steering arms 25, a main rod 5 of the handlebar and a movable connecting rod that is fastened to the bottom end of the main rod 5 of the handlebar. The movable connecting rod and the horizontal connecting rod 30 are connected to form a movable diamond frame (the structure shown in the Part B of FIG. 2) that coordinates the two front wheels in steering. Both sides of the top end of the handlebar 48 are respectively provided with a hand grip 8, a brake crank 7 and a regulator 6. Two ends of the horizontal connecting rod 30 are respectively fastened to the steering arms 25 at the front of the inner sides of the front forks 23 through the second bearing 31 in a movable way. The two steering arms 25 present a certain angle and are respectively fastened to the front of the inner sides of the front forks 23. The main rod 5 of the handlebar comprises a lower main rod 5b that passes through the pad bearing 43 fastened to the bottom of the load carrying base 2 and an upper main rod 5a that is connected to the top end of the lower main rod 5b through a mortise and tenon joint in a movable way. The bottom end of the upper main rod 5a of the handlebar is connected to the top end of the lower main rod 5b of the handlebar through pins and rivets 40 in a movable way. The top of the tenon of the bottom end of the upper main rod 5a of the handlebar is provided with an upper arc-shaped cluster gear 41 in a movable way. A lower arc-shaped cluster gear 42 is fastened to the mortise at the top end of the lower main rod 5b of the handlebar. The upper arc-shaped cluster gear 41 and the lower arc-shaped cluster gear 42 are engaged with each other. A spring 39 is arranged inside the upper main rod 5a of the handlebar. The top end of the spring 39 is fastened to the inside of the upper main rod 5a of the handlebar. The bottom end of the spring 39 is closely connected to the top end of the upper arc-shaped cluster gear 41. The top end of the upper arc-shaped cluster gear 41 is fastened to a steel wire rope 38. The steel wire rope 38 is fastened to the regulator 6 through the spring 39 in the tube of the upper main rod 5a of the handlebar. The upper arc-shaped cluster gear 41 is provided with an oval hole 44. The pins and rivets 40 connect the lower main rod 5b of the handlebar with the upper main rod 5a of the handlebar in a movable way through the oval hole 44. The upper main rod 5a of the handlebar can be adjusted at will within the angle between the upward vertical direction and the horizontal direction by using the regular 6 to separate and recombine the upper arc-shaped cluster gear 41 and the lower arc-shaped cluster gear 42.

Figure 4:
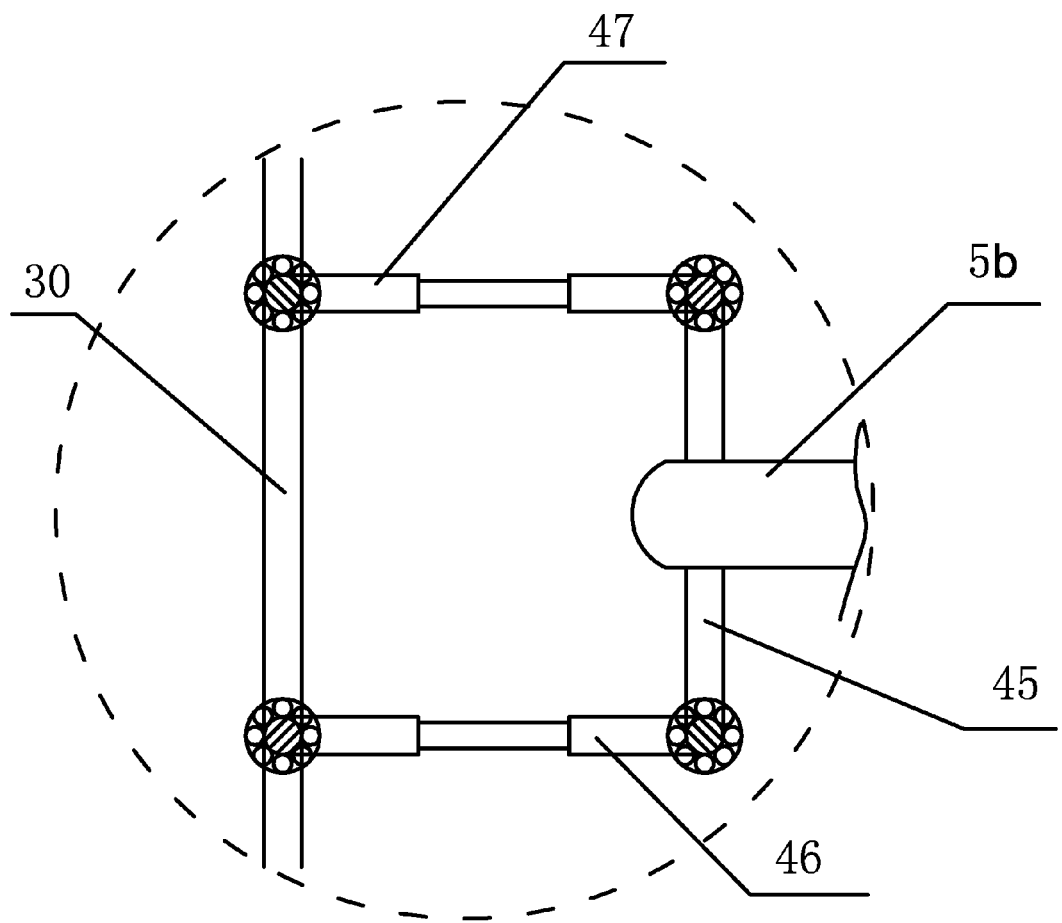
FIG. 4 is a partial enlarged view of part B of FIG. 2.

As shown in FIG. 4, the movable connecting rod and the horizontal connecting rod are connected to form a movable diamond frame (the structure shown in the Part B of FIG. 2) that coordinates the two front wheels 21 in steering. The movable connecting rod comprises the first movable connecting rod 45, the second movable connecting rod 46, and the third movable connecting rod 47. The bottom end of the lower main rod 5b of the handlebar is fastened to the center of the first movable connecting rod 45. One end of the second movable connecting rod 46 and one end of the third movable connecting rod 47 are respectively fastened to the two ends of the first movable connecting rod 45 through bearings. The other end of the second movable connecting rod 46 and the other end of the third movable connecting rod 47 are respectively fastened to the horizontal connecting rod 30 through bearings. The two ends of the horizontal connecting rod 30 are respectively connected to steering arms 25 through the second bearing 31 in a movable way. Two steering arms 25 present a certain angle and are respectively fastened to the front of the inner sides of the front forks 23.

The brake mechanism comprises a brake crank 7, a disc brake 22, and a disc brake block 20. The disc brake 22 is fastened to the inner walls of the two front forks 23 and the rear vertical tube 15 of the frame. The disc brake block 20 is fastened to the inner sides of the two front wheels 21 and the main axle 29 of the rear axle. The brake crank 7 is installed on the two ends of the handlebars 48. The brake crank 7 controls the disc brakes 22 through brake cables.

The chain drive mechanism comprises a large faceplate 19 unit installed on the pedal mechanism and a small faceplate unit 37 installed on the main axle 29 of the rear axle. The large faceplate unit 19 and the small faceplate unit 37 are connected through chains 17 to realize chain transmission. The largest faceplate 37a of the small faceplate unit 37 is arranged on the main axle 29 of the rear axle backward and forward. The largest faceplate 37a allows the four wheeled cycle to run forward and backward through the chains 17 to realize chain transmission. The rest faceplates are fastened on the main axle 29 of the rear axle forward, which can allow the four wheeled cycle to run forward only.

The saddle 11 is installed on the top end of the seat post 12. The seat post 12 is inserted in the rear vertical tube 15 of the frame. The rear vertical tube 15 of the frame is provided with a first fastening device 14 which is used to adjust the up and down movements of the seat post in the rear vertical tube 15 of the frame and can make the seat post 12 move up and down in the rear vertical tube 15 of the frame freely.

EXAMPLE

Figure 8:
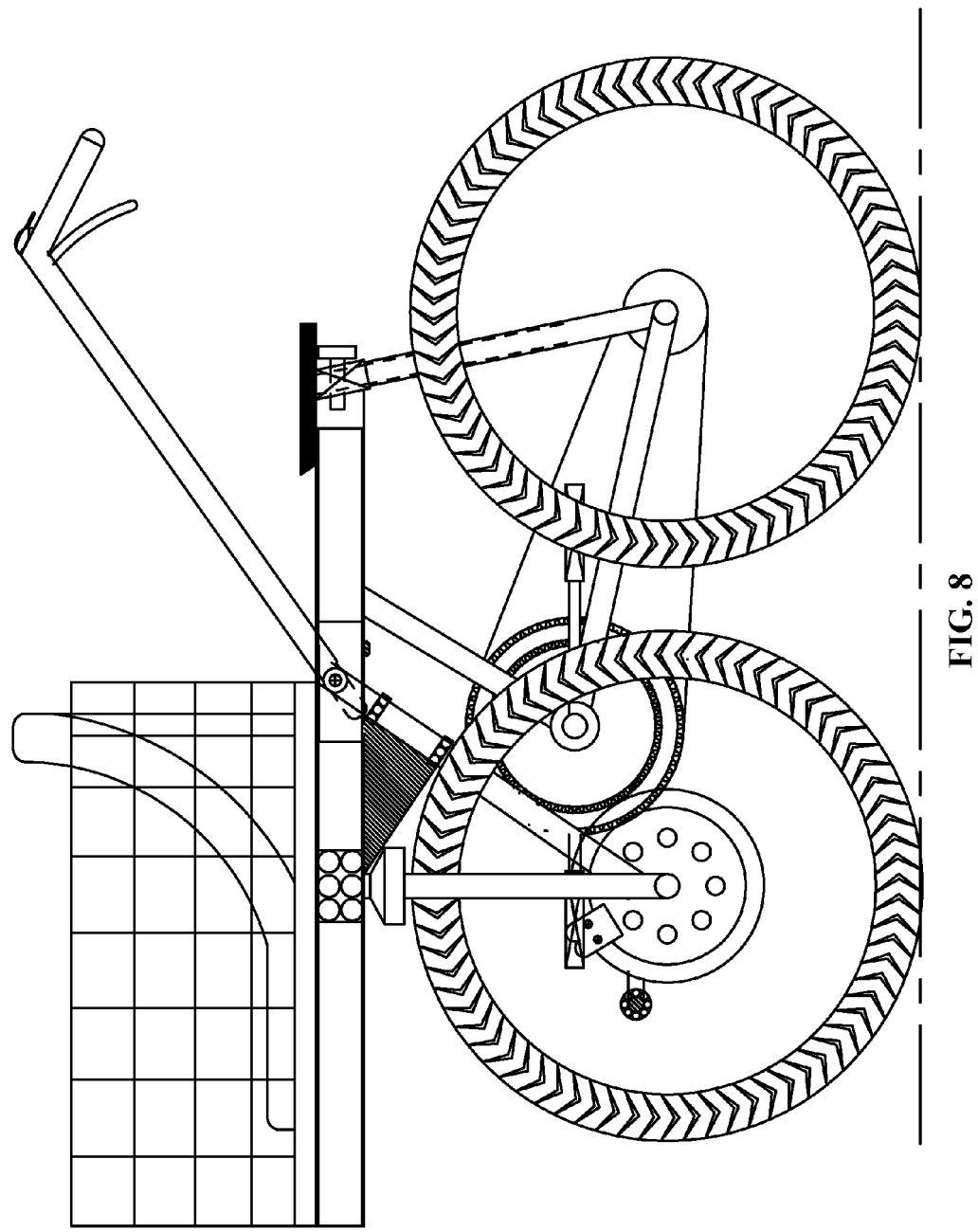
FIG. 8 is a schematic diagram of a four wheeled cycle, which is transformed into a shopping cart or a baby stroller.

In this example, the invention provides a multi-functional four wheeled cycle. The four wheeled cycle can be transformed into a shopping cart if the middle rod 9 of the frame completely retracts into the front casing tube 3 of the frame, the bars 1 for dismounting, installation, and horizontal folding built in the load carrying base 2 are unfolded, and the angle between the upper main rod 5a of the handlebar and the frame is adjusted by the regulator 6 installed on the handlebar 48, as shown in FIG. 8.

Figure 9:
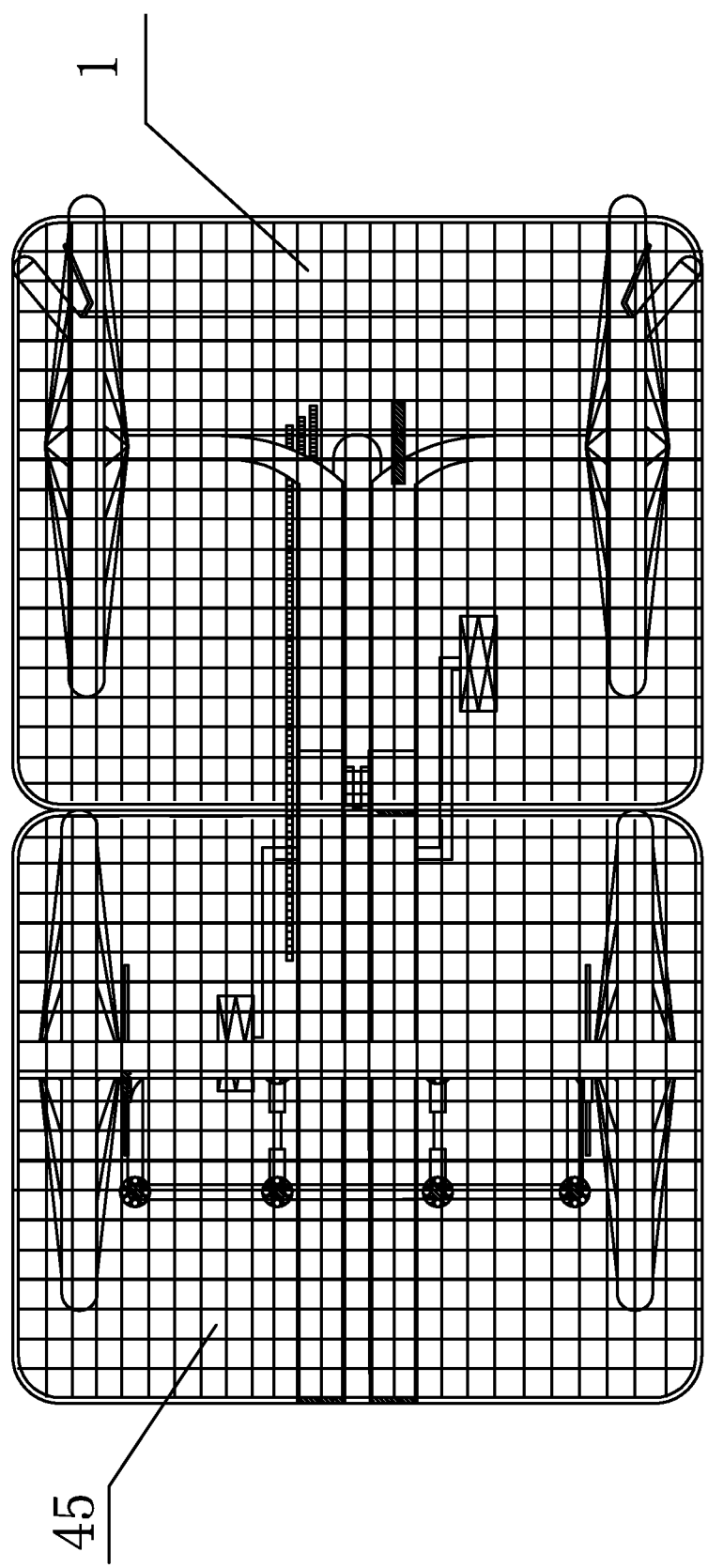
FIG. 9 is a schematic diagram of a four wheeled cycle, which is transformed into a picnic car.

The four wheeled cycle can be transformed into a baby stroller if a child safety seat 4 is installed in the unfolded bars 1 of the load carrying base 2. The four wheeled cycle can be transformed into a picnic table which is convenient for picnic if the bars 1 in the load carrying base 2 are opened, thereby making the front, left and right bars hang, and the rear bars 1 are laid flat with the bottom 36 of the load carrying base 2, as shown in FIG. 9.

Figure 10:
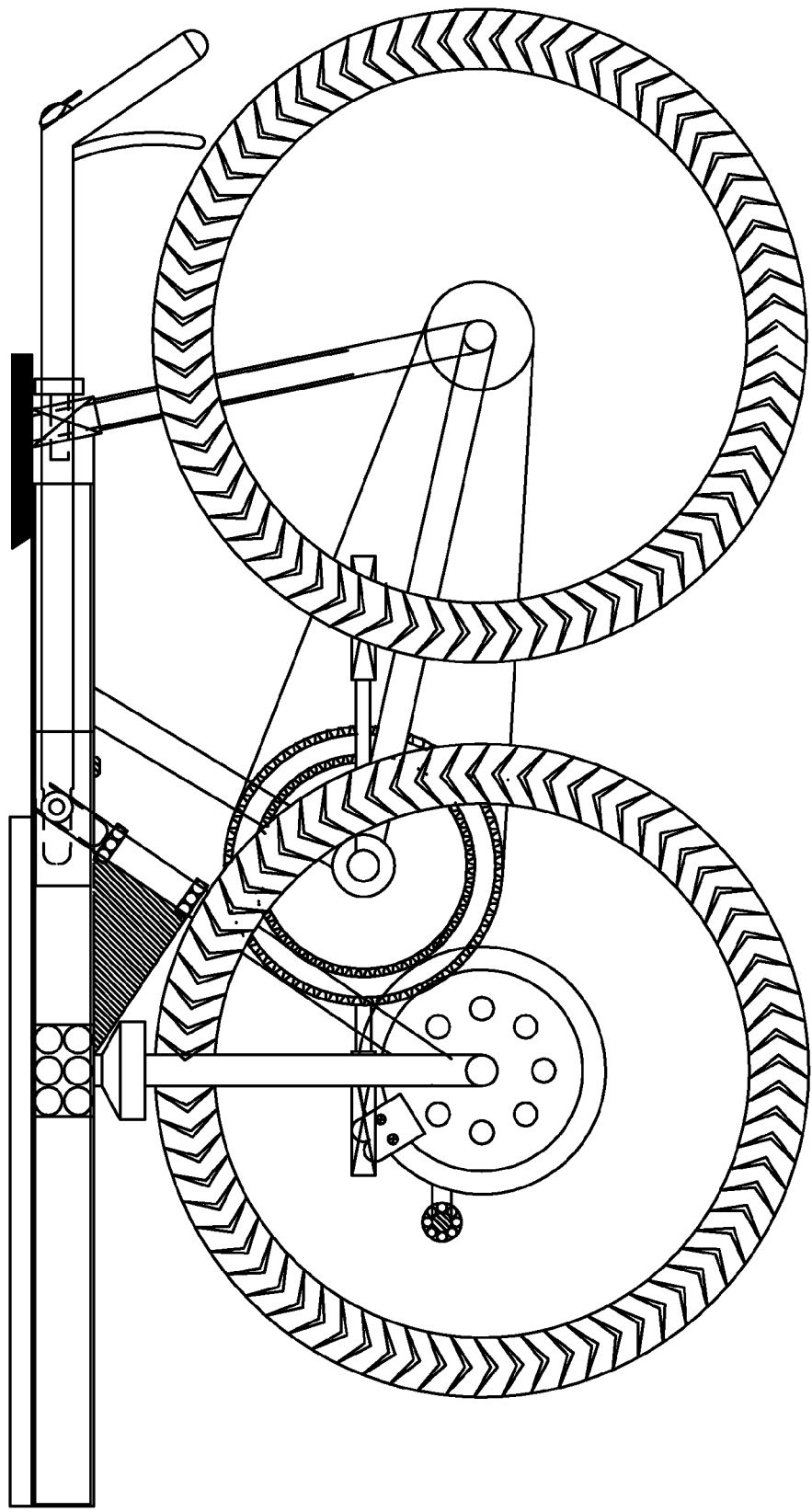
FIG. 10 is a schematic diagram showing a folded state of a four wheeled cycle in accordance with one embodiment of the invention.

If the middle rod 9 of the frame completely retracts into the front casing tube 3 of the frame, the second fastening device 27 is adjusted to lower the saddle 11 and the seat post 12, the regulator 6 is adjusted to fold the upper main rod 5a of the handlebar backward to keep flat between two rear casing tubes 10 of the frame, and the bars 1 of the four sides are folded and retracted to keep the bars and the load carrying base 2 in the same plane, the volume of the whole four wheeled cycle becomes smaller and the four wheeled cycle can be put in a trunk or a cabinet, as shown in FIG. 10.

To sum up, the invention provides a multi-function four wheeled cycle which can be transformed into a baby stroller, a shopping cart, and a picnic car, and is suitable for busy people to relax and hike in their spare time. On the premise of keeping the four wheels safe and stable, the bars 1 and the frame retract and the handlebar is folded to minimize the volume of the four wheeled cycle to allow the four wheeled cycle easy to carry and take care of. The invention provides a multi-function four wheeled cycle which has advantages of exquisite design, a simple structure, ingenious connection methods, convenient transformation methods, portable, practical and fashion design, great volume changes, coordinated and beautiful appearances, telescopic frames and foldable and telescopic handlebars. The four wheeled cycle can realize convenient transformation between a baby stroller, a shopping cart and a picnic car.

During manufacturing, the multi-function four wheeled cycle of the invention adopts 16-inch rims. The whole four wheeled cycle is 1,316 mm long, 580 mm wide and 800-1,000 mm high. The completely folded and retracted four wheeled cycle is 966 mm long, 580 mm wide and 500 mm high, as shown in FIG. 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A four wheeled cycle, comprising:
a) a frame;
b) a load carrying base;
c) two front wheels;
d) two rear wheels;
e) a steering mechanism;
f) a brake mechanism;
g) a pedal mechanism;
h) a chain drive mechanism; and
i) a saddle unit;
wherein
the two front wheels are connected to a bottom of the load carrying base through front forks;
the frame is a retractable frame, comprising a rear support frame, a down tube, a transverse tube, and at least two telescopic casing tube assemblies that are arranged side by side;
each of the telescopic casing tube assemblies comprises a front casing tube, a middle rod, and a rear casing tube;
the front casing tube is fastened to the bottom of the load carrying base and sleeves a front end of the middle rod in a movable way;
the rear casing tube is fastened to and sleeves a rear end of the middle rod;
a portion of the middle rod before the rear casing tube is capable of retracting into the front casing tube;
a tube mouth of the front casing tube is provided with a second fastening device which is used to fasten the middle rod so as to adjust the telescopic movement of the middle rod in the front casing tube;
the steering mechanism comprises a handlebar comprising a main rod, a horizontal connecting rod, steering arms fixed on a lower end of the front forks, and a movable connecting rod that is fastened to a bottom end of the main rod of the handlebar;
two ends of the horizontal connecting rod are in fixed connection to the steering arms, respectively;
the main rod of the handlebar comprises an upper main rod and a lower main rod which are in a pivotal connection; and
the upper main rod can be adjusted within an angle between an upward vertical direction and a horizontal direction by using a regulator.

2. The four wheeled cycle of claim 1, wherein
both ends of the handlebar are provided with a hand grip, a brake crank, and a regulator;
a top end of the upper main rod of the main rod is connected to a center of the handlebar;
a bottom end of the upper main rod is connected to a top end of the lower main rod through pins and rivets in a movable way;
a top of a tenon disposed at the bottom end of the upper main rod is provided with an upper arc-shaped cluster gear in a movable way;
a lower arc-shaped cluster gear is fastened to a mortise disposed at the top end of the lower main rod;
the upper arc-shaped cluster gear and the lower arc-shaped cluster gear are engaged with each other;
a spring is arranged inside the upper main rod, a top end of the spring is fastened inside the upper main rod, a bottom end of the spring is connected to a top end of the upper arc-shaped cluster gear; and
the top end of the upper arc-shaped cluster gear is fastened to a steel wire rope, and the steel wire rope is fastened to the regulator through the spring in the upper main rod.

3. The four wheeled cycle of claim 2, wherein
the movable connecting rod and the horizontal connecting rod are connected to form a movable diamond frame that is used to coordinate the two front wheels in steering;
the movable connecting rod comprises a first movable connecting rod, a second movable connecting rod, and a third movable connecting rod;
a bottom end of the lower main rod is fastened to a center of the first movable connecting rod;
one end of the second movable connecting rod and one end of the third movable connecting rod are respectively fastened to two ends of the first movable connecting rod through bearings, and the other end of the second movable connecting rod and the other end of the third movable connecting rod are fastened to the horizontal connecting rod through bearings; and
the two ends of the horizontal connecting rod are respectively connected to the steering arms through bearings in a movable way; and the two steering arms present a certain angle and are respectively fastened to the front of inner sides of the front forks.

4. The four wheeled cycle of claim 1, wherein the tube mouth of the front casing tube is provided with guide ribs, the middle rod is provided with a guide groove that is used to determine the telescopic length, and the guide ribs and the guide groove cooperate with each other in a sliding way.

5. The four wheeled cycle of claim 1, wherein each front casing tube of the frame is installed side by side and is fastened to the bottom of the load carrying base; each rear casing tube of the frame is fixed with a corresponding front casing tube of the frame side by side; the front casing tube and the middle rod are corresponding tubes of any regular shapes; and the middle rod and the front casing tube cooperate with each other in a sliding way.

6. The four wheeled cycle of claim 1, wherein
the bottom of the load carrying base is provided with a cross bar on top ends of the two front forks;
two ends of the cross bar are connected to the two front forks through bearings in a movable way;
hinged bars are provided in the plane of the load carrying base;
the load carrying base comprises a front connecting rod, a left connecting rod, a right connecting rod, and a rear connecting rod;
the front connecting rod, the left connecting rod, the right connecting rod, and the rear connecting rod are respectively connected by the hinged bars; and
sides of the bars are provided with connecting hooks that are used to connect adjacent bars.

7. The four wheeled cycle of claim 1, wherein the chain drive mechanism comprises a large faceplate unit installed on the pedal mechanism and a small faceplate unit installed on a main axle of a rear axle; the large faceplate unit and the small faceplate unit are connected through chains; and the small faceplate unit comprises a largest faceplate for driving the four wheeled cycle to run forward and backward.

8. The four wheeled cycle of claim 1, wherein
the rear support frame comprises a rear vertical tube, a left slanting branch tube, and a right slanting branch tube;
an upper end of the left slanting branch tube and an upper end of the right slanting branch tube are welded to the rear vertical tube;
a lower end of the left slanting branch tube and a lower end of the right slanting branch tube are respectively welded to both ends of a main axle of a rear axle;
a lower end of the rear vertical tube and a rear end of the transverse tube are fastened to a midpoint of the main axle of the rear axle;
the rear casing tube is fastened to an upper end of the down tube and to an upper end of the rear vertical tube; and
a lower end of the down tube and a front end of the transverse tube are fastened to an axle sleeve of the pedal mechanism.

9. The four wheeled cycle of claim 8, wherein
the brake mechanism comprises a brake crank, a disc brake, and a disc brake block;
the disc brake is fastened to inner walls of the two front forks and the rear vertical tube;
the disc brake block is fastened to inner sides of the two front wheels and the main axle of the rear axle;
the brake crank is installed on two ends of the handlebar; and
the brake crank controls the disc brake through a brake cable.

10. The four wheeled cycle of claim 9, wherein the load carrying base is provided with a child safety seat, a transparent elastic shield, or both.

11. The four wheeled cycle of claim 1, wherein the load carrying base is provided with a child safety seat, a transparent elastic shield, or both.

\* \* \* \* \*